United States Patent
Venero et al.

(10) Patent No.: US 9,022,088 B2
(45) Date of Patent: May 5, 2015

(54) METHOD AND APPARATUS FOR REINFORCING A PIPELINE

(71) Applicant: Pipestream B.V., Rijswijk (NL)

(72) Inventors: Nicholas John Venero, Clinton, NY (US); Andrew Thomas Merriman, Clinton, NY (US); Raymond Nicholas Burke, Houston, TX (US); Timothy Bond, Houston, TX (US); David Miles, Houston, TX (US); Robert Conder, Kemnay (GB)

(73) Assignee: Pipestream B.V., Rijswijk (NL)

( * ) Notice: Subject to any disclaimer, the term of this patent is extended or adjusted under 35 U.S.C. 154(b) by 0 days.

(21) Appl. No.: 14/273,313

(22) Filed: May 8, 2014

(65) Prior Publication Data

US 2014/0326412 A1    Nov. 6, 2014

Related U.S. Application Data

(62) Division of application No. 13/503,017, filed as application No. PCT/US2010/045966 on Aug. 19, 2010, now Pat. No. 8,758,539.

(60) Provisional application No. 61/253,384, filed on Oct. 20, 2009.

(51) Int. Cl.
| | |
|---|---|
| *B29C 53/70* | (2006.01) |
| *F16L 55/168* | (2006.01) |
| *B29C 63/10* | (2006.01) |
| *F16L 55/18* | (2006.01) |
| *F16L 57/02* | (2006.01) |
| *F16L 58/08* | (2006.01) |
| *F16L 58/10* | (2006.01) |
| *F16L 58/16* | (2006.01) |
| *B29C 63/48* | (2006.01) |

(52) U.S. Cl.
CPC ........... *F16L 55/1686* (2013.01); *B29C 63/105* (2013.01); *B29C 2063/485* (2013.01); *F16L 55/18* (2013.01); *F16L 57/02* (2013.01); *F16L 58/08* (2013.01); *F16L 58/1063* (2013.01); *F16L 58/16* (2013.01)

(58) Field of Classification Search
CPC ..... F16L 55/1686; B65H 81/08; B29C 53/58; B29C 53/60; B29C 53/66; B29C 53/665; B29C 53/68; B29C 53/70; B29C 63/105
USPC ......... 156/391, 392, 574, 425, 428, 430, 431, 156/432, 169, 172, 184, 185, 187, 188, 190, 156/191, 195
See application file for complete search history.

(56) References Cited

U.S. PATENT DOCUMENTS

| | | |
|---|---|---|
| 2,191,316 A | 2/1940 | Hamlin |
| 3,994,766 A | 11/1976 | Dedels |
| 4,058,427 A | 11/1977 | Wilson |

(Continued)

*Primary Examiner* — John Goff
*Assistant Examiner* — Carson Gross
(74) *Attorney, Agent, or Firm* — Patterson & Sheridan, L.L.P.

(57) ABSTRACT

Systems and methods for reinforcing an existing pipeline. In some embodiments, the methods include positioning a pipeline wrapping apparatus on the existing pipeline, wherein the pipeline wrapping apparatus comprises a winding head, feeding a strip of material through the winding head, attaching an end of the strip of material to the existing pipeline, and helically wrapping the strip around the existing pipeline by rotating the winding head and axially translating the winding head relative to the existing pipeline.

19 Claims, 9 Drawing Sheets

(56) References Cited

U.S. PATENT DOCUMENTS

| | | |
|---|---|---|
| 4,145,243 A | 3/1979 | Cottam |
| 5,261,995 A | 11/1993 | Golden |
| 5,417,786 A | 5/1995 | Denman et al. |
| 6,000,261 A | 12/1999 | Johnston |
| 7,971,610 B2 | 7/2011 | Booth et al. |
| 2009/0165518 A1 | 7/2009 | Booth |

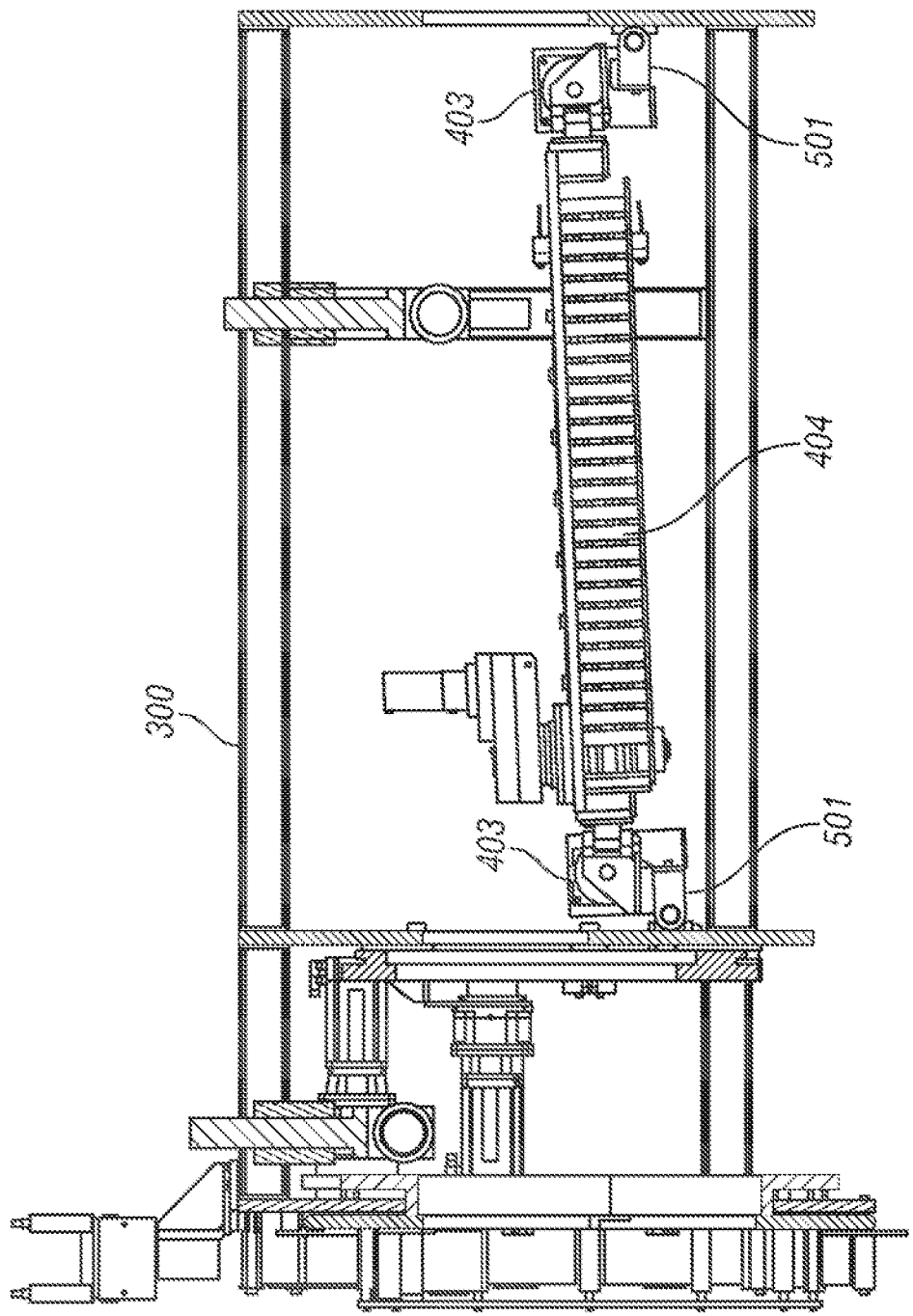

METHOD AND APPARATUS FOR REINFORCING A PIPELINE

BACKGROUND OF THE INVENTION

Extensive pipeline systems exist for carrying gas or liquid under pressure over long distances. These pipelines are subject to corrosion from the outside as a result of moisture from the surrounding environment and/or from the inside due to the fluid or gas being transported. The corrosion thins the walls of the pipeline, which can eventually lead to the leaking of fluid or gas. Because the contents of the pipeline are under pressure, any leak will rapidly increase in volume.

Weakened sections of pipeline may be discovered through inspections of the pipeline. Once discovered, various methods exist for externally patching pipelines to repair leaks or reinforce sections of the pipeline with walls that have thinned from corrosion. Repair methods that allow for the pipeline to continue operation without interruption are particularly valuable because of the revenue that is lost by the pipeline owner from any flow interruption, in addition to the problems resulting from supply disruptions to end users of the product flowing through the pipeline.

SUMMARY OF THE INVENTION

The present invention generally relates to methods and apparatus for reinforcing an existing pipeline. In some embodiments, the methods include positioning a pipeline wrapping apparatus on the existing pipeline, wherein the pipeline wrapping apparatus comprises a winding head, feeding a strip of material through the winding head, attaching an end of the strip of material to the existing pipeline, and helically wrapping the strip around the existing pipeline by rotating the winding head and axially translating the winding head relative to the existing pipeline.

In some embodiments, the system includes a movable trailer with a lifting apparatus and a spool of a strip material supported thereon and a pipeline wrapping apparatus. The pipeline wrapping apparatus includes a winding head and a movement assembly. The winding head is configured to receive the strip from the spool and rotate around the existing pipeline. The movement assembly includes a track configured to press against the existing pipeline and axially translate the pipeline wrapping apparatus relative to the existing pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5B is a side view of the movement assembly shown in FIG. 5A;

DETAILED DESCRIPTION

Figure 1:
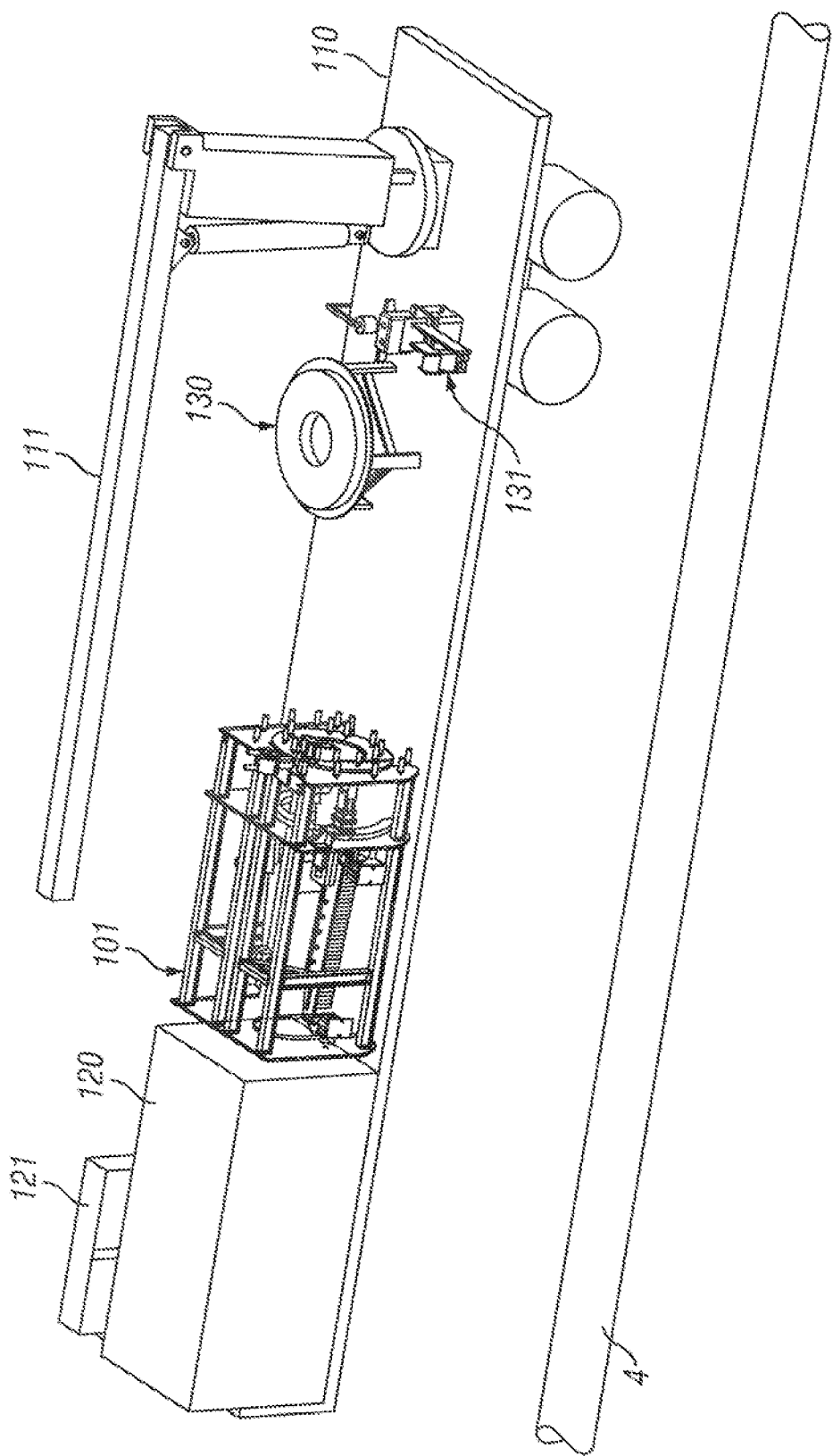
FIG. 1 is an isometric view of a pipeline wrapping apparatus in accordance with one embodiment.

In the drawings and description that follows, like parts are marked throughout the specification and drawings with the same reference numerals. The drawing figures are not necessarily to scale. Certain features of the invention may be shown exaggerated in scale or in somewhat schematic form and some details of conventional elements may not be shown in the interest of clarity and conciseness. The invention is subject to embodiments of different forms. Some specific embodiments are described in detail and are shown in the drawings, with the understanding that the disclosure is to be considered an exemplification of the principles of the invention, and is not intended to limit the invention to the illustrated and described embodiments. The different teachings of the embodiments discussed below may be employed separately or in any suitable combination to produce desired results. The terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

In FIG. 1, a pipeline wrapping apparatus 101 in accordance with embodiments disclosed herein is shown. The pipeline wrapping apparatus 101 may be transported on a trailer 110 to a location along a pipeline 4. The trailer 110 may include a crane 111 to place the pipeline wrapping apparatus 101 at selected locations along the pipeline 4. To allow for the operation of the pipeline wrapping apparatus 101 in remote locations, the trailer 110 may further include a generator 120 to provide electrical power to the pipeline wrapping apparatus 101 and a control unit 121. One or more spools 130 of a strip material 133 may be disposed on the trailer. A feeding arm 131 for feeding the strip from the spool 130 to the pipeline wrapping apparatus 101 may also be included. The strip material 133 may be, for example, a continuous strip of martensitic steel or low carbon steel with a corrosion protection coating.

Various non-metallic materials may also be used for the strip material 133. For example, the strip material 133 may be a thermoplastic, such as polybutylene terephthalate or polypropylene, or a thermoset resin, such as polyester, polyurethane, vinylester, or epoxy. The non-metallic material may be reinforced with glass or other fibers. Thermoplastics and thermoset resins may be produced using pultrusion, which provides a continuous process of producing a substantially constant cross-section. As part of the pultrusion process, the non-metallic material may be reinforced with the fibers while being formed into the strip material 133. The resulting strip material 133 may be wound onto a spool for use with embodiments of the present disclosure.

Figure 2:
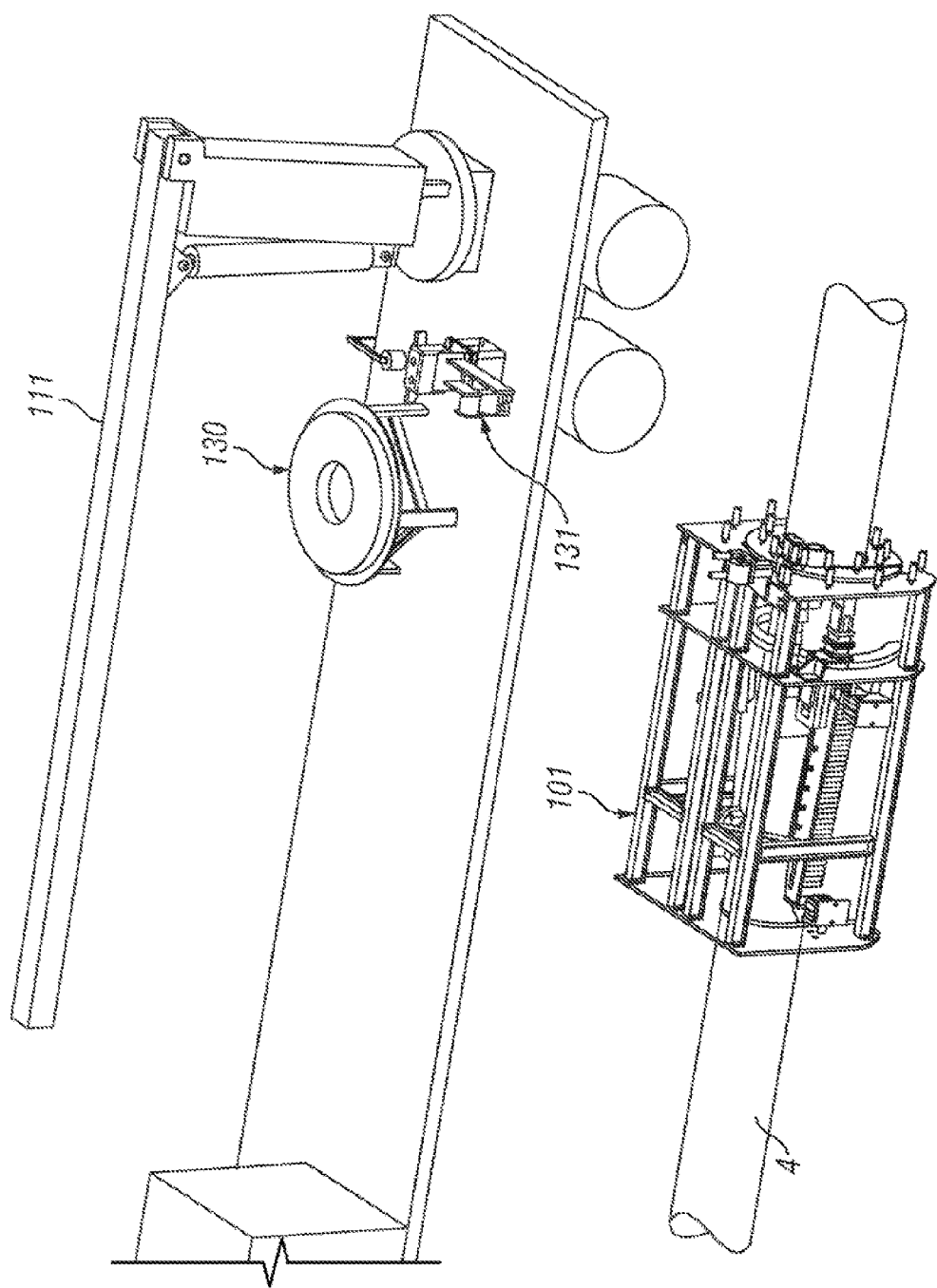
FIG. 2 is an isometric view of the pipeline wrapping apparatus shown in FIG. 1 after placement on a pipeline in accordance with one embodiment.
Figure 3:
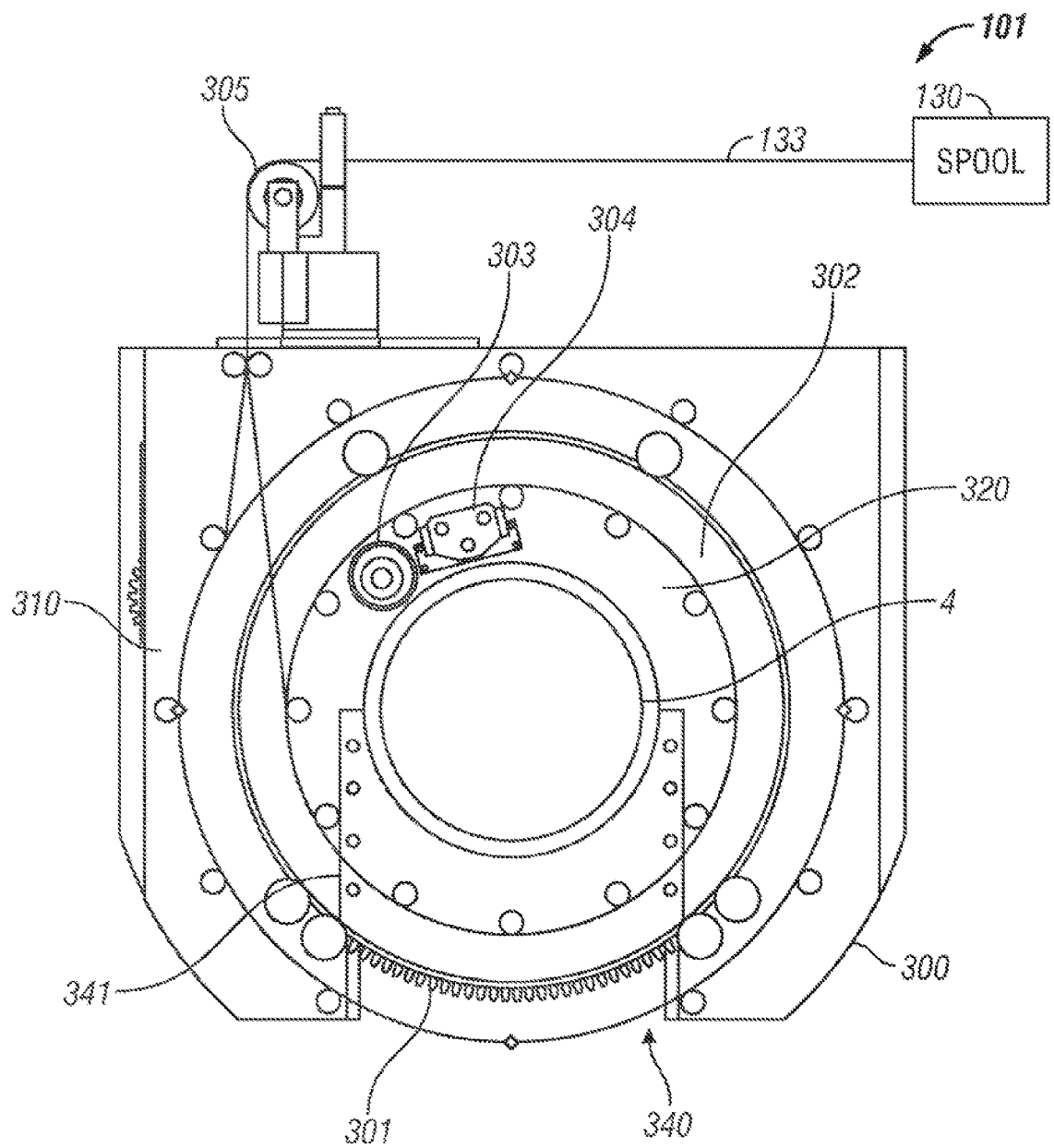
FIG. 3 is an end view of a pipeline wrapping apparatus in accordance with one embodiment.
Figure 4:
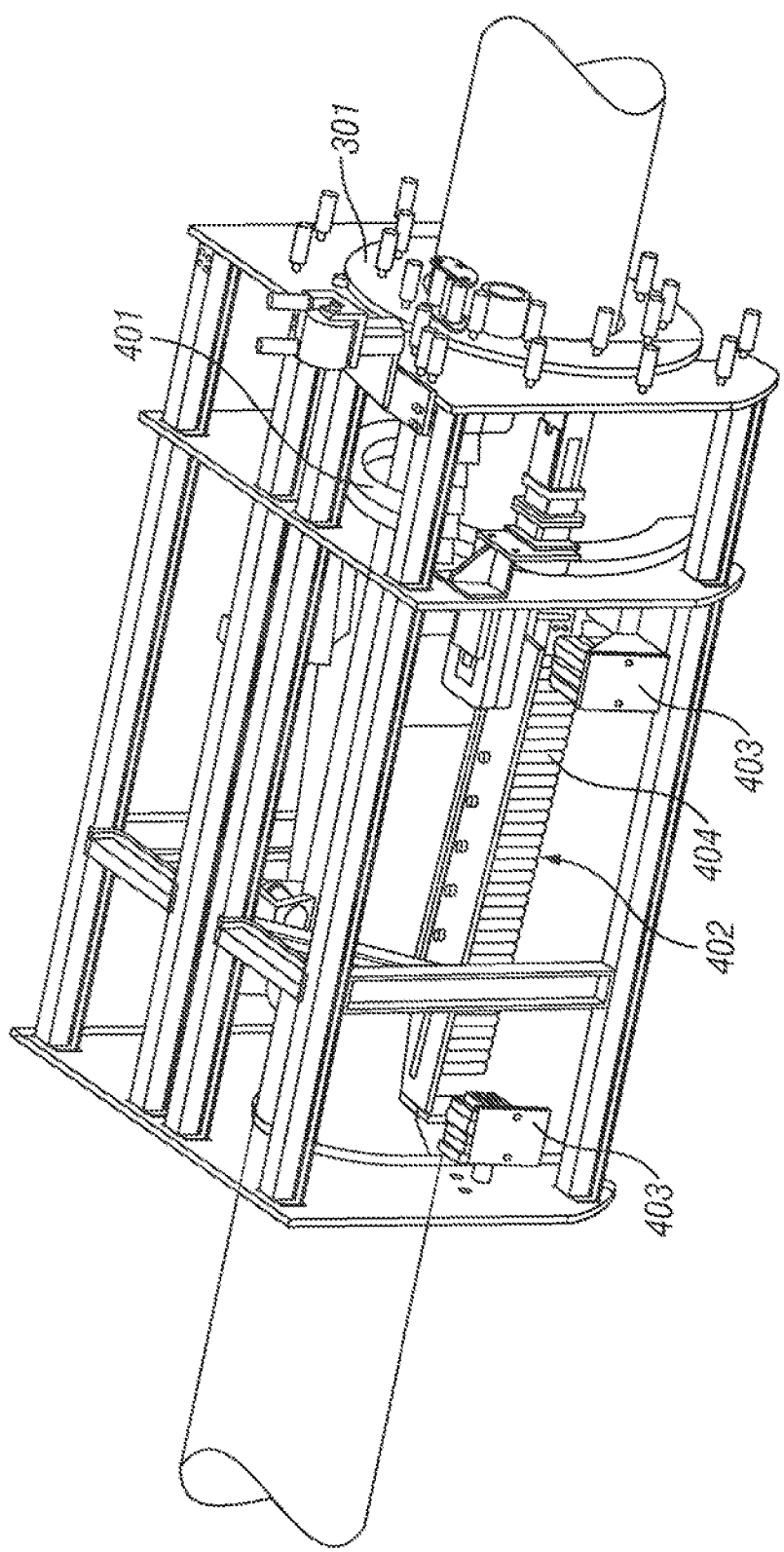
FIG. 4 is an isometric view of the pipeline wrapping apparatus shown in FIG. 3.

FIGS. 2-4 show the pipeline wrapping apparatus 101 after placement onto the pipeline 4. Preparation for the use of the pipeline wrapping apparatus 101 depends on the manner in which the pipeline 4 is installed. If the pipeline 4 is buried, a trench is dug around the pipeline 4 to expose the sections to be thickened. With the pipeline 4 sufficiently exposed, the pipeline wrapping apparatus 101 is placed onto the pipeline 4 using the crane 111. A frame 300 of the pipeline wrapping apparatus 101 has an opening 340 that is sufficiently wide to receive the pipeline 4. A winding head 301, which wraps the strip material around the pipeline 4, includes a removable portion 341 that is sufficiently wide to receive the pipeline 4. After placement onto the pipeline 4, removable portion 341 is reattached to the winding head 301 to fully surround the pipeline 4.

With reference to FIGS. 3 and 4, the wall reinforcing operation may be carried out by feeding the strip material 133 from the spool 130 to the pipeline wrapping apparatus 101. The strip 133 is fed down from roller 305 onto a carrying roll 302. Going, in the orientation shown in FIGS. 3 and 4, counterclockwise around carrying roll 302, the strip 133 is threaded through a turnaround roll 303 and a preform assembly 304, which is configured to bend the strip 133 into a diameter close to the diameter of the pipeline 4. The end 320 of the strip 133 may then be affixed to the outside of the pipeline 4 using, for example, a quick setting adhesive, a mechanical clamp, or welding.

After affixing the end 320 of the strip 133, wrapping the strip 133 around the pipeline 4 is carried out by the winding head 301. As the winding head 301 winds the strip around the pipeline 4, additional strip 133 is wrapped around carrying roll 302. Each rotation of the winding head 301 adds another layer of strip 133 to the carrying roll 302, which accumulates strip 133 faster than what is wrapped onto pipeline 4 because of the greater diameter. The carrying capacity (indicated by circle 310) of the carrying roll 302 may be selected such that after half of the strip 133 from spool 130 is wrapped onto the pipeline 4, the remaining half of the strip 133 is carried by the carrying roll 302.

The winding head 301 moves axially relative to the pipeline 4 during rotating in order to helically wrap the strip 133 around the pipeline 4. The entire pipeline wrapping apparatus 101 may be movable relative to the pipeline 4 by attaching one or more track assemblies to the pipeline 4. In one embodiment shown in FIG. 4, a movement assembly 402 is used to move the pipeline wrapping apparatus 101 axially relative to the pipeline 4 during rotation of the winding head 301.

Figure 5A:
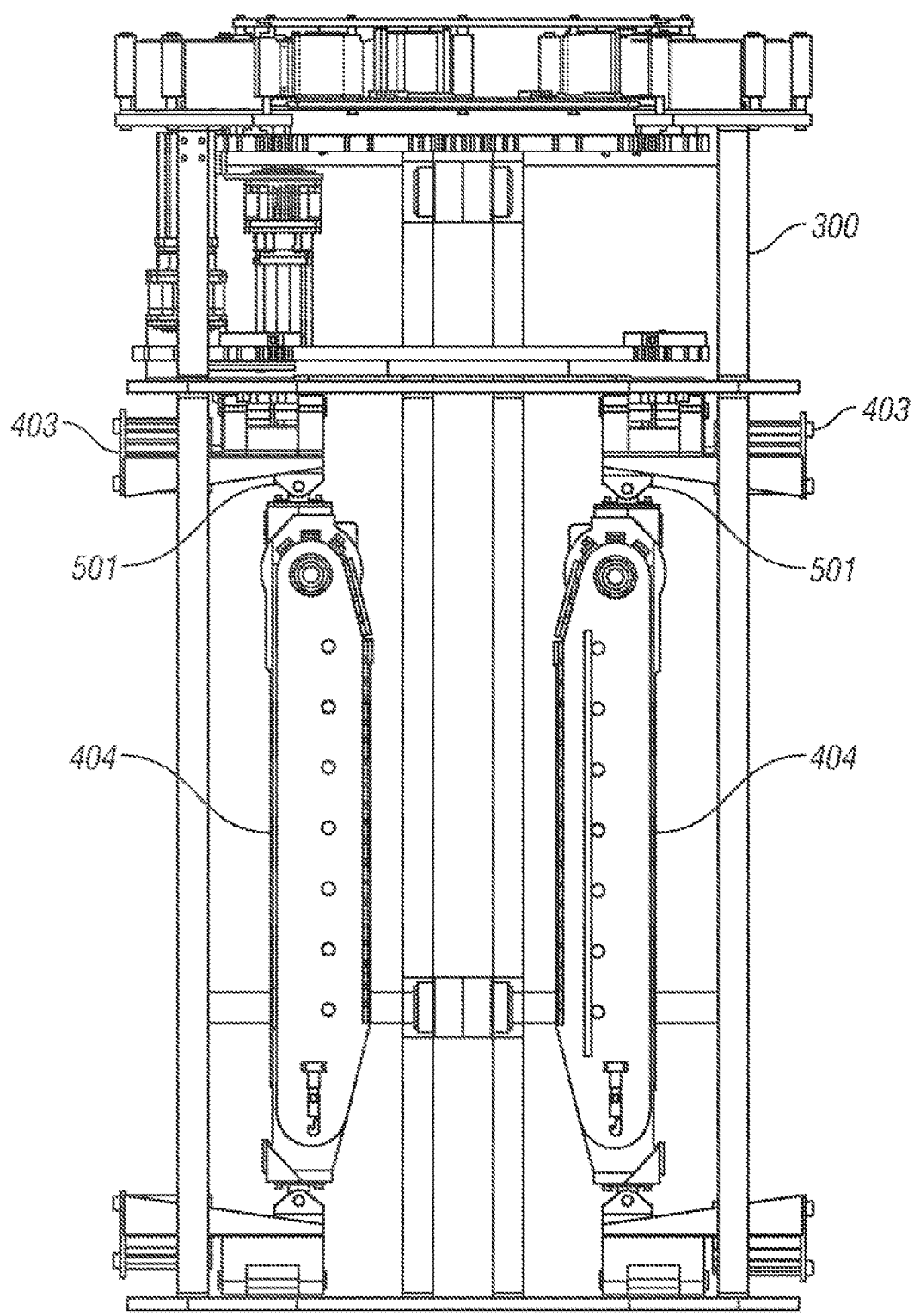
FIG. 5A is a bottom view of a movement assembly for the pipeline wrapping apparatus in accordance with one embodiment.
Figure 5C:
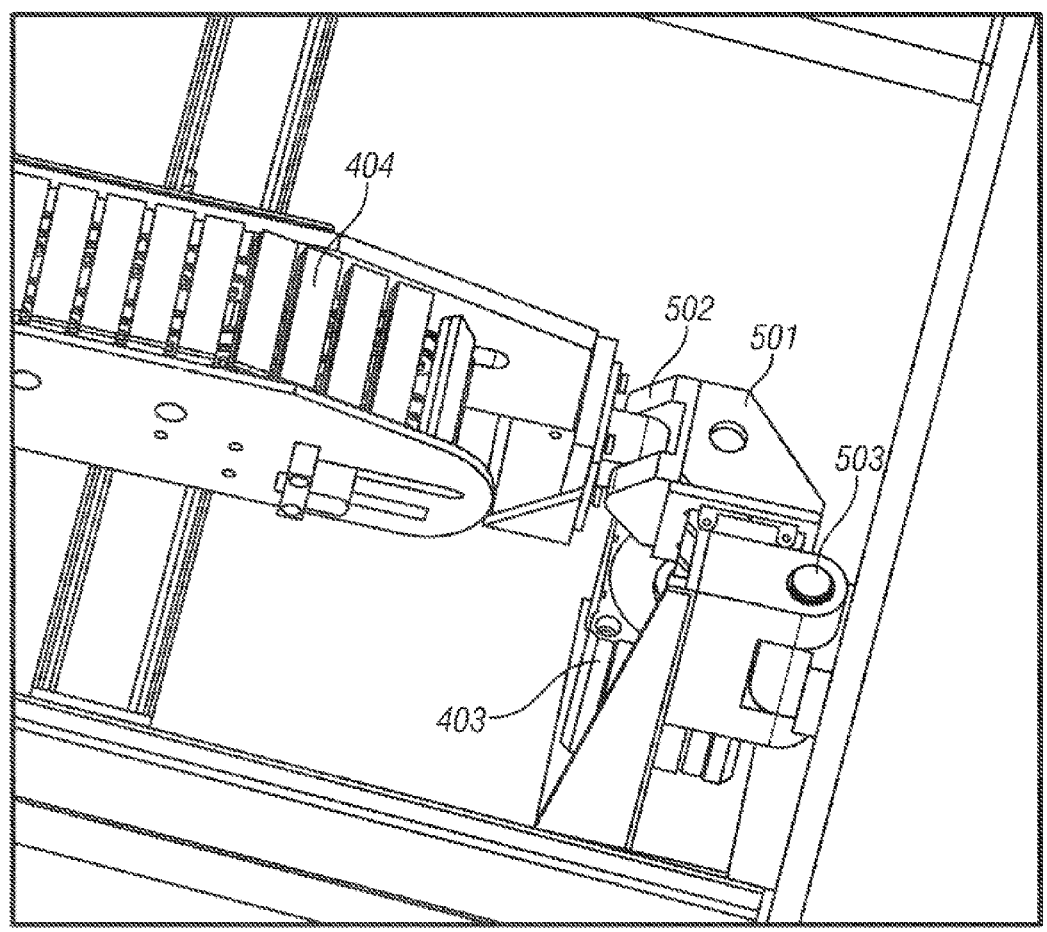
FIGS. 5C and 5D are detailed views of portions of the movement assembly shown in FIG. 5A.
Figure 5D:
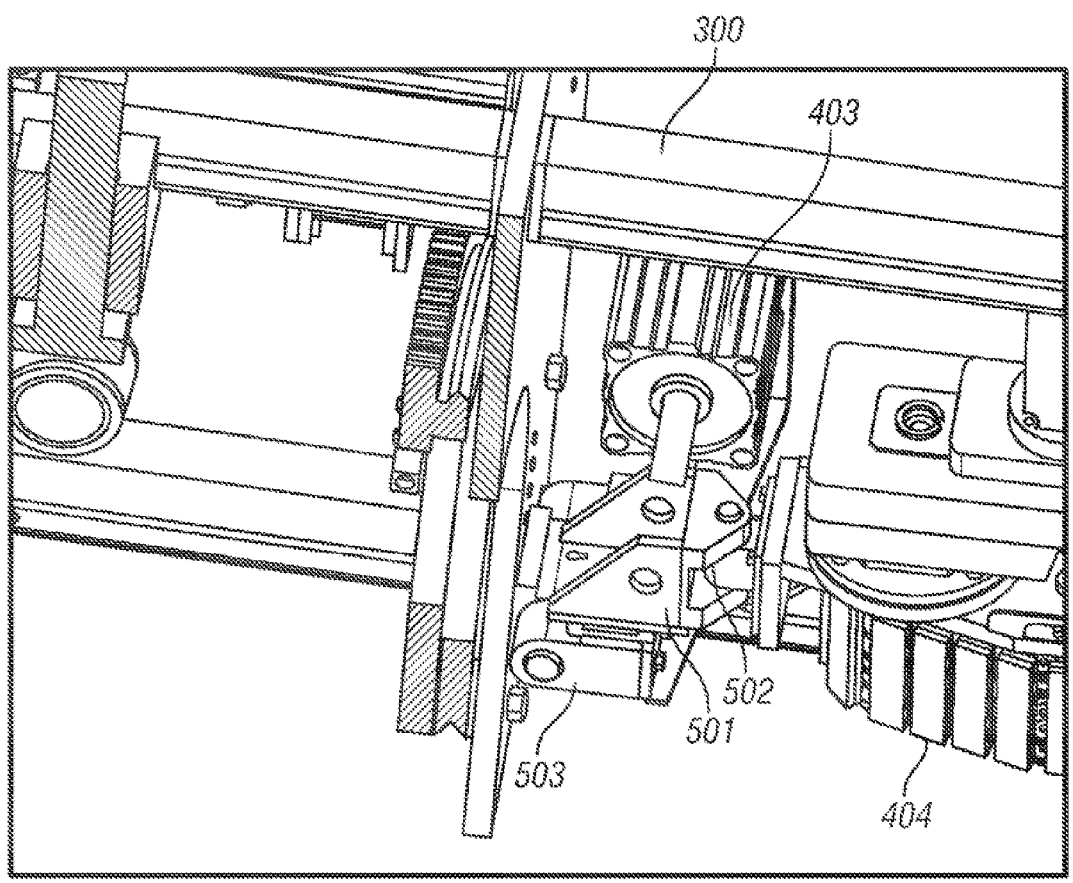

The movement assembly 402, which is shown in greater detail in FIGS. 5A-5D, includes a track 404, which actuates in a manner similar to treads on a tank or other tracked vehicle. The movement assembly 402 also includes cylinders 403 on opposing ends of the track 404, which may be pneumatic, hydraulic, or electrically actuated. The cylinders 403 press the ends of the track 404 against the pipeline 4 to provide sufficient frictional force such that movement of the track 404 causes the pipeline wrapping apparatus 101 to move axially relative to the pipeline 4. Another track 404 and cylinders 403 may be provided on the opposite side of the pipeline 4 to balance the track 404 and cylinders 403 visible in FIG. 4. Each track 404 may be mounted on a pivoting anchor 501 that allows the tracks 404 to be tilted along the axis of the pipeline 4 to control the radial position of the pipeline wrapping apparatus 101 around the pipeline 4. The pivoting anchor 501 may be attached to the tracks 404 with a pivot 502 and to the frame 300 with a pivot 503, as best shown in FIGS. 5C and 5D. Cylinders 403 may be attached to the tracks 404 indirectly through the pivoting anchor 501.

The movement assembly 402 illustrated in detail in FIGS. 5A-5D allows for torque to be applied to the pipeline 4, which counteracts torque from the winding head 301 as it wraps the pipeline 4. The alignment of the tracks 404 relative to the axis of the pipeline 4 can be adjusted to maintain the orientation of the pipeline wrapping apparatus 101 on the pipeline during the wrapping process. Increasing the angle of the tracks 404 relative to the axis of the pipeline 4 increases the amount of torque applied to the pipeline 4 by the tracks 404. The desired angle of the tracks 404 varies, in part, according to the conditions of the exterior of the pipeline 4.

The pipeline wrapping apparatus 101 may further include an oscillating adhesive assembly 401 that applies adhesive to the pipeline 4 ahead before the strip 133 is wound onto the pipeline 4. The adhesive may be provided in tanks (not shown) to a metering pump (not shown) that applies a selected amount of adhesive to the pipeline 4. The rotational rate of the winding head 301 may govern the volume flow rate of adhesive from the metering pump in order to provide a more precise amount of adhesive to the pipeline 4. Examples of adhesives that may be used to adhere the strip 133 to the pipeline 4 include liquid epoxies, paste epoxies (single and multi-part), acrylics (e.g., methacrylate), polyurea, phenolic, and anaerobic and polyurethane adhesives.

Figure 6:
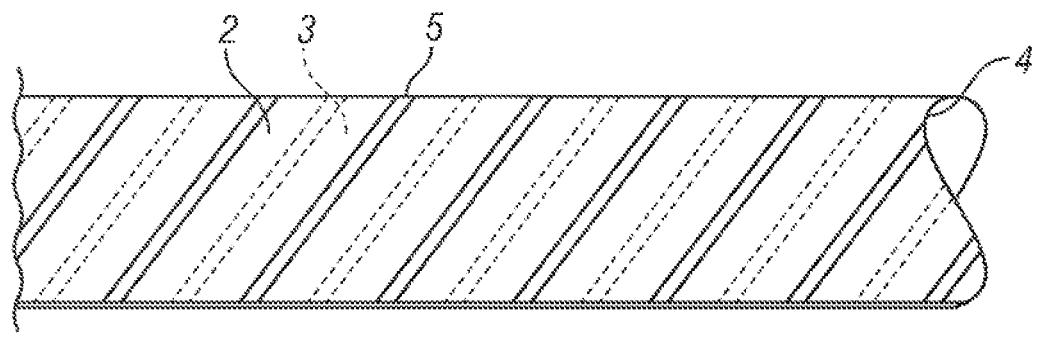
FIG. 6 is a side view of a repaired section of pipeline in accordance with one embodiment.

An example of a pipeline 4 with walls reinforced in accordance with embodiments disclosed herein is shown in FIG. 6. In this embodiment, the pipeline 4 is helically wrapped with two successive layers 2, 3 of the strip material 133. The pipeline wrapping apparatus 101 shown in FIGS. 3 and 4 may be used to apply both layers 2, 3. The axial movement provided by the movement assembly 402 may be timed with the rotation rate of the winding head 301 in order to control the angle of the layers 2, 3 and a gap 5 between the successive wrap of the strip. To apply the first layer 3, the pipeline wrapping apparatus is axially translated along the pipeline 4 while the winding head rotates. The coordinated axial translation and winding continues for a selected length of the pipeline 4, which may be selected according to the length of strip 133 stored in the spool 130. After the winding of the first layer 3, the pipeline wrapping apparatus is returned to the starting position on the pipeline 4 and the second layer 2 is applied in a manner similar to the first layer 3. The helical winding of the second layer 2 may be offset by about half the pitch of the helical winding of the first layer 3. Additional layers may be added to continue to add to the wall thickness of the pipeline 4 as desired. In another embodiment, the pipeline wrapping apparatus 101 may include a second winding head in order to provide the second layer after the first layer as the pipeline wrapping apparatus 101 is axially translated along the pipeline 4.

After the layer(s) are added to the pipeline, the pipeline wrapping apparatus may be lifted back onto the trailer to be deployed at another location to be reinforced or repaired. If the length of pipeline to be reinforced or repaired exceeds the length of strip provided by the spool, the pipeline wrapping apparatus may be positioned at the ending point of the prior wrapping location to being the wrapping process again. The trailer may be relocated as necessary to continue the wrapping process.

In another embodiment, a protective outer layer may be applied to the pipeline after wrapping the layer(s) as described above. The protective outer layer may be, for example, liquid epoxy or urethane. The protective outer layer may be applied using a separate pipeline coating unit, or by adding a pipeline coating module to the pipeline wrapping apparatus that resembles the oscillating adhesive assembly 401 described above. The pipeline coating module may be attached to the pipeline wrapping apparatus on the opposite side of the winding head 301 from the oscillating adhesive assembly 401 so that the pipeline coating module passes over the pipeline 4 after the winding head 301 applies the layer(s) 2, 3 for reinforcing the pipeline 4. The material for the protective outer layer may be provided using a tank on the pipeline wrapping apparatus or by a separate tank connected to the pipeline coating module by a hose. The separate tank may be placed on the trailer. The tank and the hose may be heated to prevent the material from solidifying within or to assist with cross-linking.

Embodiments disclosed herein reinforce existing pipeline in order to restore damaged pipeline or to upgrade the maximum allowable operating pressure (MAOP). Damage to the existing pipeline that can be repaired through increased wall thickness includes thinned walls from corrosion, stress corrosion cracking (SCC), defective welds, or other external damage. The added wall thickness may restore the pipeline to its original MAOP, or greater. If the pipeline has not sustained damage, the MAOP may be increased by adding wall thickness as disclosed herein.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A pipeline wrapping apparatus comprising:
   a winding head configured to receive a strip from a spool of reinforcing material and rotate around an existing pipeline; and
   a movement assembly comprising:
      a frame;
      a pair of tracks operable to axially translate the pipeline wrapping apparatus relative to the existing pipeline;
      cylinders on opposing ends of the tracks and configured to press the tracks against the existing pipeline; and
      pivoting anchors connecting the tracks, frame, and cylinders such that:
         the tracks are tilted relative to an axis of the pipeline, and
         operation of the movement assembly exerts counter torque on the pipeline.

2. The pipeline wrapping apparatus of claim 1, wherein the winding head has a removable portion, wherein, when removed, the existing pipeline is insertable within the winding head, and when replaced, the existing pipeline is fully surrounded by the winding head.

3. The pipeline wrapping apparatus of claim 1, further comprising a preform assembly configured to bend the strip to a diameter slightly larger than a diameter of the existing pipeline.

4. The pipeline wrapping apparatus of claim 1, further comprising an oscillating adhesive assembly configured to apply an adhesive to the existing pipeline ahead of the strip.

5. The pipeline wrapping apparatus of claim 1, further comprising a pipeline coating module configured to apply a protective outer layer to the existing pipeline after application of the strip.

6. The pipeline wrapping apparatus of claim 1, further comprising the spool, wherein the reinforcing material is low carbon steel or martensitic steel.

7. The pipeline wrapping apparatus of claim 6, wherein the reinforcing material has a corrosion protection coating.

8. The pipeline wrapping apparatus of claim 1, further comprising the spool, wherein the reinforcing material is nonmetallic.

9. The pipeline wrapping apparatus of claim 8, wherein the reinforcing material is a fiber reinforced polymer.

10. A system for reinforcing an existing pipeline, the system comprising:
    a movable trailer with a lifting apparatus and a spool of reinforcing strip material supported thereon; and
    a pipeline wrapping apparatus comprising:
       a winding head configured to receive the strip from the spool and rotate around the existing pipeline; and
       a movement assembly comprising:
          a frame;
          a pair of tracks operable to axially translate the pipeline wrapping apparatus relative to the existing pipeline;
          cylinders on opposing ends of the tracks and configured to press the tracks against the existing pipeline; and
          pivoting anchors connecting the tracks, frame, and cylinders such that:
             the tracks are tilted relative to an axis of the pipeline, and
             operation of the movement assembly exerts counter torque on the pipeline.

11. The system of claim 10, wherein the pipeline wrapping apparatus further comprises a preform assembly configured to bend the strip to a diameter slightly larger than a diameter of the existing pipeline.

12. The system of claim 10, wherein the pipeline wrapping apparatus further comprises an oscillating adhesive assembly configured to apply an adhesive to the existing pipeline ahead of the strip.

13. The system of claim 10, wherein the pipeline wrapping apparatus further comprises a pipeline coating module configured to apply a protective outer layer to the existing pipeline after application of the strip.

14. The system of claim 10, wherein the lifting apparatus is a crane.

15. The system of claim 10, wherein the winding head has a removable portion, wherein, when removed, the existing pipeline is insertable within the winding head, and when replaced, the existing pipeline is fully surrounded by the winding head.

16. The system of claim 10, wherein the reinforcing material is low carbon steel or martensitic steel.

17. The system of claim 16, wherein the reinforcing material has a corrosion protection coating.

18. The system of claim 10, wherein the reinforcing material is nonmetallic.

19. The system of claim 18, wherein the reinforcing material is a fiber reinforced polymer.

* * * * *